US012377298B2

(12) United States Patent
Cowell et al.

(10) Patent No.: US 12,377,298 B2
(45) Date of Patent: Aug. 5, 2025

(54) HARNESSES

(71) Applicant: TREEMAGINEERS LTD, Pitlochry Perth and Kinross (GB)

(72) Inventors: Christopher Sidney Cowell, Pitlochry Perth and Kinross (GB); Elliot James Tanner, Montgomery Powys (GB)

(73) Assignee: TREEMAGINEERS LTD., Pitlochry (GB)

( * ) Notice: Subject to any disclaimer, the term of this patent is extended or adjusted under 35 U.S.C. 154(b) by 0 days.

(21) Appl. No.: 17/586,879

(22) Filed: Jan. 28, 2022

(65) Prior Publication Data

US 2022/0241625 A1 Aug. 4, 2022

(30) Foreign Application Priority Data

Jan. 29, 2021 (GB) ..................................... 2101243

(51) Int. Cl.
*A62B 35/00* (2006.01)

(52) U.S. Cl.
CPC ...... *A62B 35/0037* (2013.01); *A62B 35/0012* (2013.01)

(58) Field of Classification Search
CPC ............ A62B 35/0037; A62B 35/0012; A62B 35/0031; A62B 35/0006
See application file for complete search history.

(56) References Cited

U.S. PATENT DOCUMENTS 2,333,646 A * 11/1943 Frankel .............. A62B 35/0037 24/135 N
11,534,633 B2 * 12/2022 Cowell .............. A62B 35/0006

FOREIGN PATENT DOCUMENTS

EP 3 332 840 A1 6/2018
FR 2976184 A1 * 12/2012 ............ A62B 35/00
WO 2020/065279 A1 4/2020

* cited by examiner

*Primary Examiner* — Andrew J Triggs
(74) *Attorney, Agent, or Firm* — NIXON & VANDERHYE

(57) ABSTRACT

A harness for supporting a person working at height, including a back, leg loops, two forward connection arrangements and a flexible load-bearing member extending between the connection arrangements, which flexible load-bearing member carries a sliding attachment device attached to a climbing line. The forward connection arrangements transfers load from the back and the leg loops to the load-bearing member. Each forward connection arrangement includes: a body with apertures through which a leg riser webbing of the harness pass to connect the body to the back and the leg loops of the harness; and a bridge passage through which the flexible load-bearing member passes. A forward connection arrangement further includes a rope adjuster with a cam in the bridge passage. The cam pivots on an axle on the body. The cam cooperates with a locking surface of the body within the bridge passage to effect locking of a rope.

15 Claims, 6 Drawing Sheets

HARNESSES

This application claims priority to GB Patent Application No. 2101243.0 filed Jan. 29, 2021, the entire contents of which are hereby incorporated by reference.

BACKGROUND TO THE INVENTION

Field of the Invention

This invention relates to personal protective equipment and, more particularly, harnesses or components thereof. Particularly, but not exclusively, the invention relates to components used to make a harness suitable for use in supporting a person working at height using rope access and hardware (metal components) that are used within its construction. It also has application for a harness and hardware that are part of a fall-protection system, for example for use by a climber.

A harness may be designed to support a user when working at height, to provide a comfortable body support for performing tasks when suspended from a rope access system. Alternatively or additionally, a harness may be used to arrest a user's fall, for example in a fall protection system used by a climber where there is the potential for a fall. Embodiments of the invention might find application to hardware used for rope access, industrial height safety, rescue, tactical applications, sport climbing, etc. Within this specification, example embodiments will be described that relate to harnesses intended for use in tree care, but this should not be taken to be limiting upon the range of applications of the invention.

SUMMARY OF THE PRIOR ART

In EP-A-3 332 840, the present applicant disclosed a range of improved forward connection arrangements that improve upon the arrangements used in the harness of FIGS. 1*a* and 1*b*. In that publication, each forward connection arrangement comprises: a body that is permanently connected to the harness and a retention component that can be removably and rigidly connected to the body to removably secure the flexible load-bearing member to the body. Amongst several embodiments, forward attachment arrangements were proposed that include a rope adjuster whereby the effective length of the rope bridge can be changed.

An aim of the present invention is to implement forward connection arrangements that have the advantages of those disclosed in EP-A-3 332 840, and which are lighter, more compact or easier and less costly to manufacture.

SUMMARY OF THE INVENTION

To this end, the present invention provides a harness for supporting a person working at height, comprising a back, leg loops, two forward connection arrangements and a flexible load-bearing member that extends between the connection arrangements, which flexible load-bearing member carries a sliding attachment device which attaches to a climbing line, the forward connection arrangements serving to transfer load from the back and the leg loops to the load-bearing member, wherein each forward connection arrangement comprises:

a. a body that has apertures through which a leg riser webbing of the harness passes to connect the body to the back and the leg loops of the harness, b. a bridge passage through which the load-bearing member passes;

and wherein:

c. at least one forward connection arrangement further includes a rope adjuster, which rope adjuster includes a cam in the bridge passage, the cam being pivoted on an axle carried on the body and the cam is disposed to cooperate with a locking surface of the body within the bridge passage to effect locking of a rope.

Preferably, the rope adjuster includes a biasing spring disposed to bias the cam towards the locking surface.

This arrangement integrates the rope adjuster into the body, so reducing the number of components in the connection arrangement. This simplifies manufacture, and reduces the potential weakness associated with fasteners used to interconnect components.

Typically, the axle is located in a bore within the body.

The load-bearing member may be formed from an elongate member, such as a rope or a length or lengths of webbing. The load-bearing member may comprise two or more similar or different elongate members. In the latter case, each rope may pass through a respective bridge passage of the body, and there may be a rope adjuster in each bridge passage. The multiple cams of the rope adjusters typically arranged for rotation about a common axis. These may be carried on a common axle or on individual axles.

The body may include a projecting lug through which an attachment aperture passes.

Most typically the body is a one-piece metal component.

DETAILED DESCRIPTION OF THE PREFERRED EMBODIMENTS

Embodiments of the invention will now be described in detail, by way of example, and with reference to the accompanying drawings.

Figure 1:
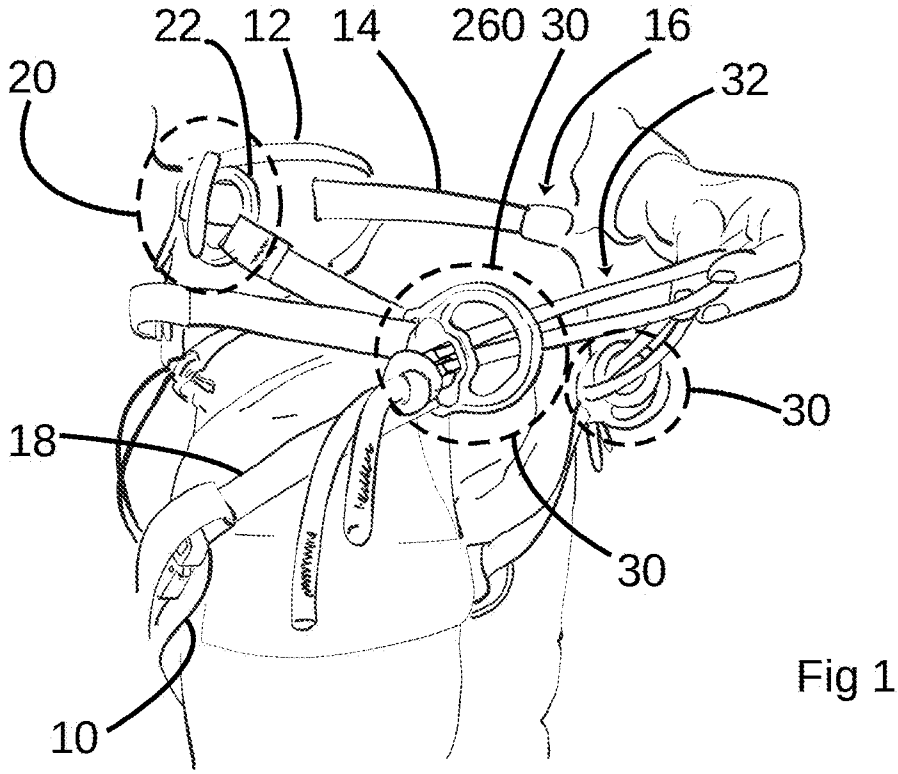
FIGS. 1 and 2 show a harness incorporating a forward connection arrangement embodying the invention.
Figure 2:
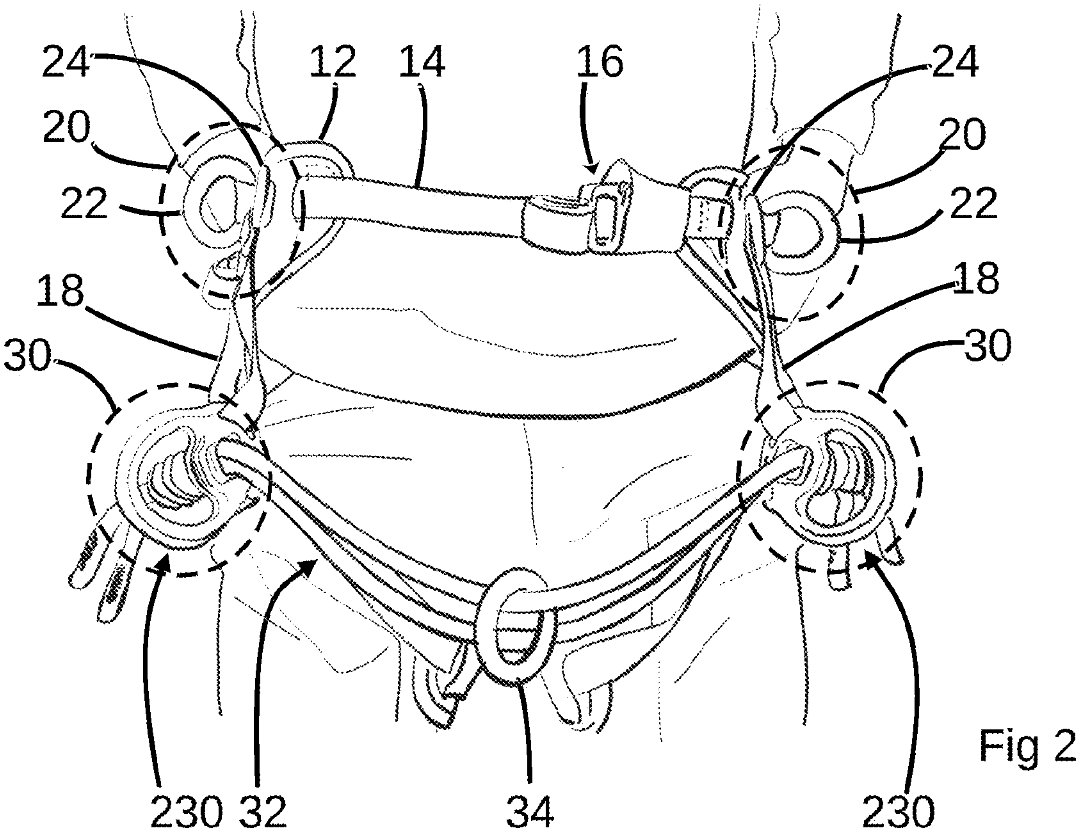
Figure 3:
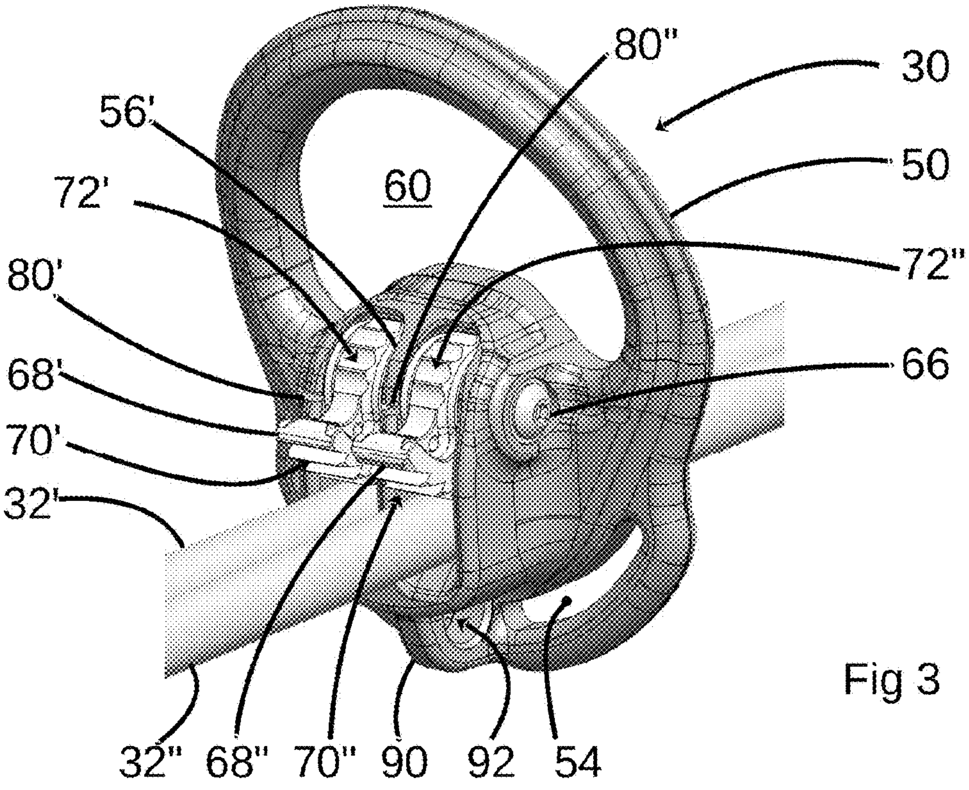
FIGS. 3 and 4 are views of a forward connection arrangement embodying the invention.
Figure 4:
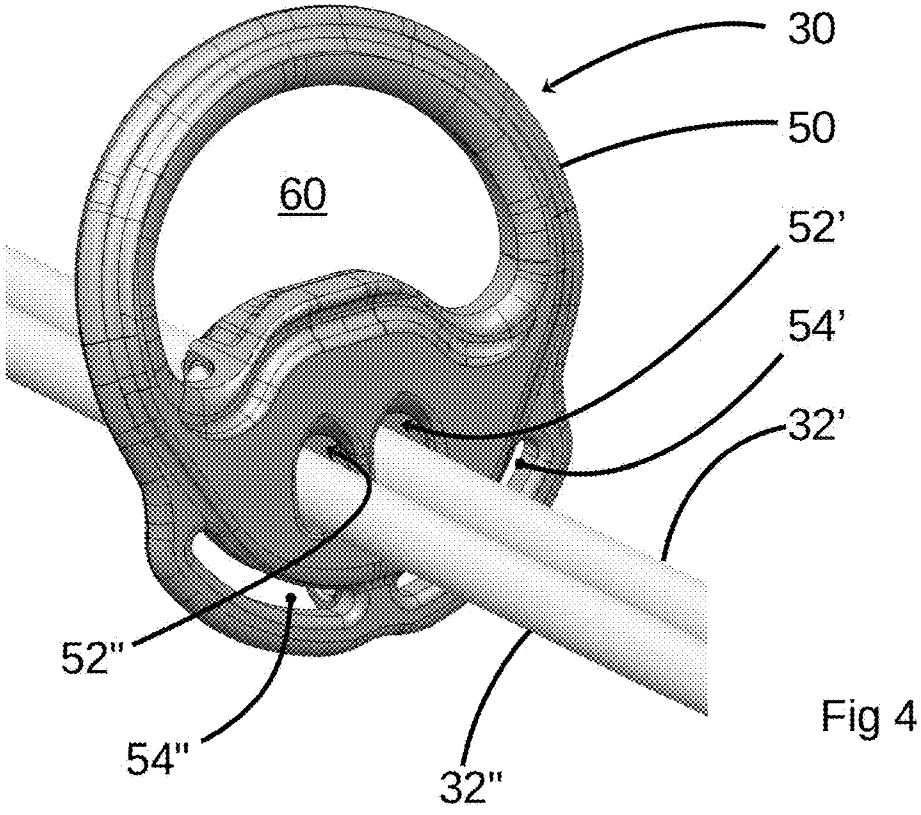
Figure 5:
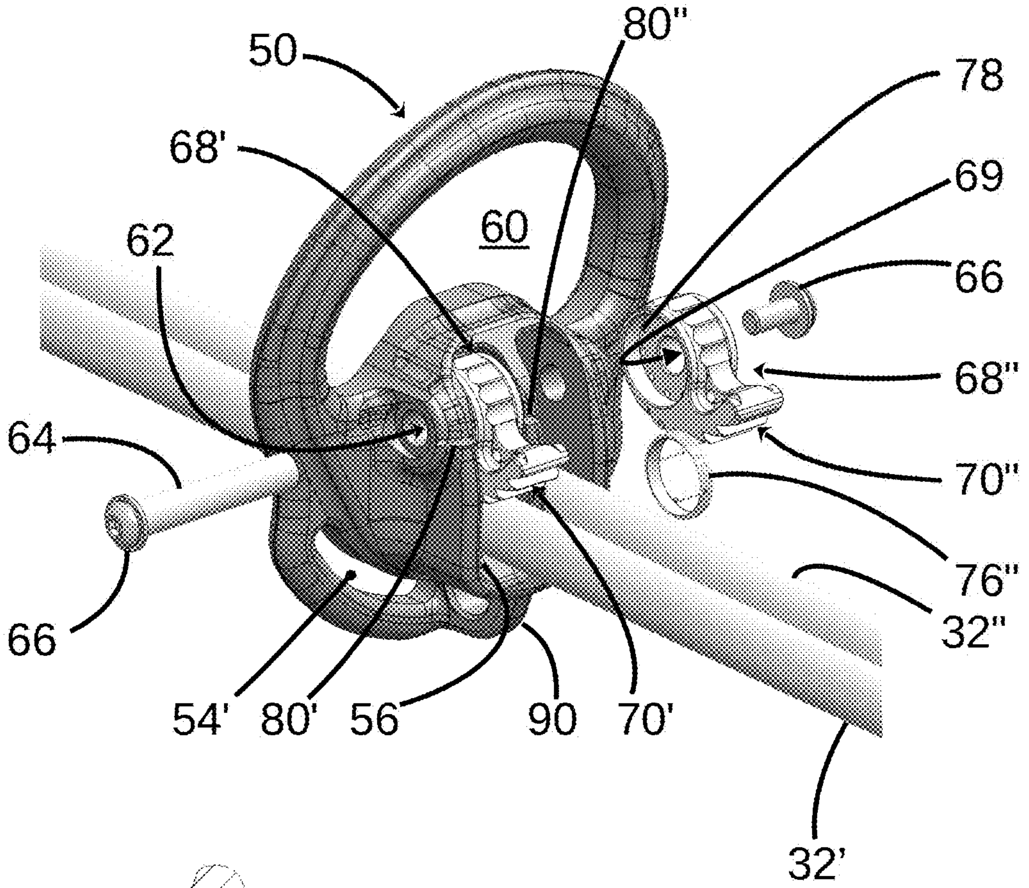
FIG. 5 is an exploded view of the embodiment of FIGS. 3 and 4.
Figure 6:
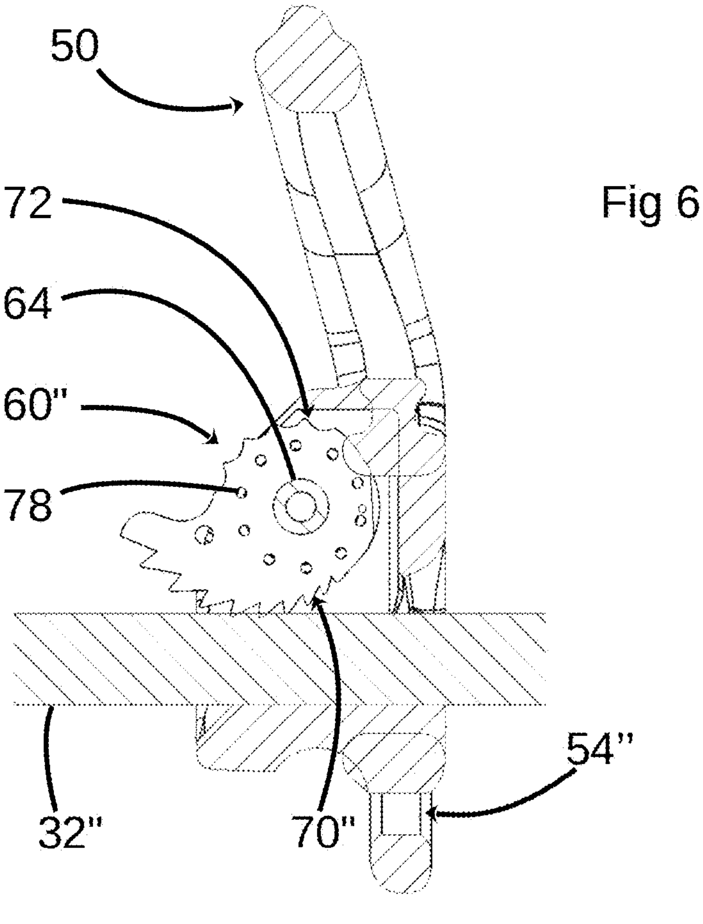
FIGS. 6 and 7 are a sectional view of the embodiment of FIGS. 3 to 5.
Figure 7:
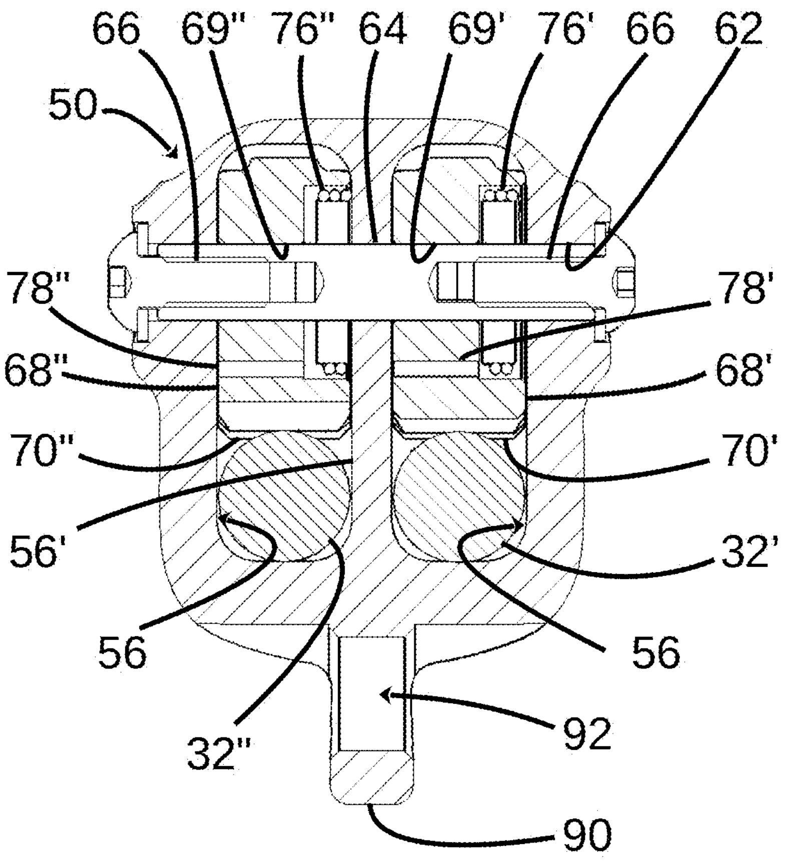
Figure 8:
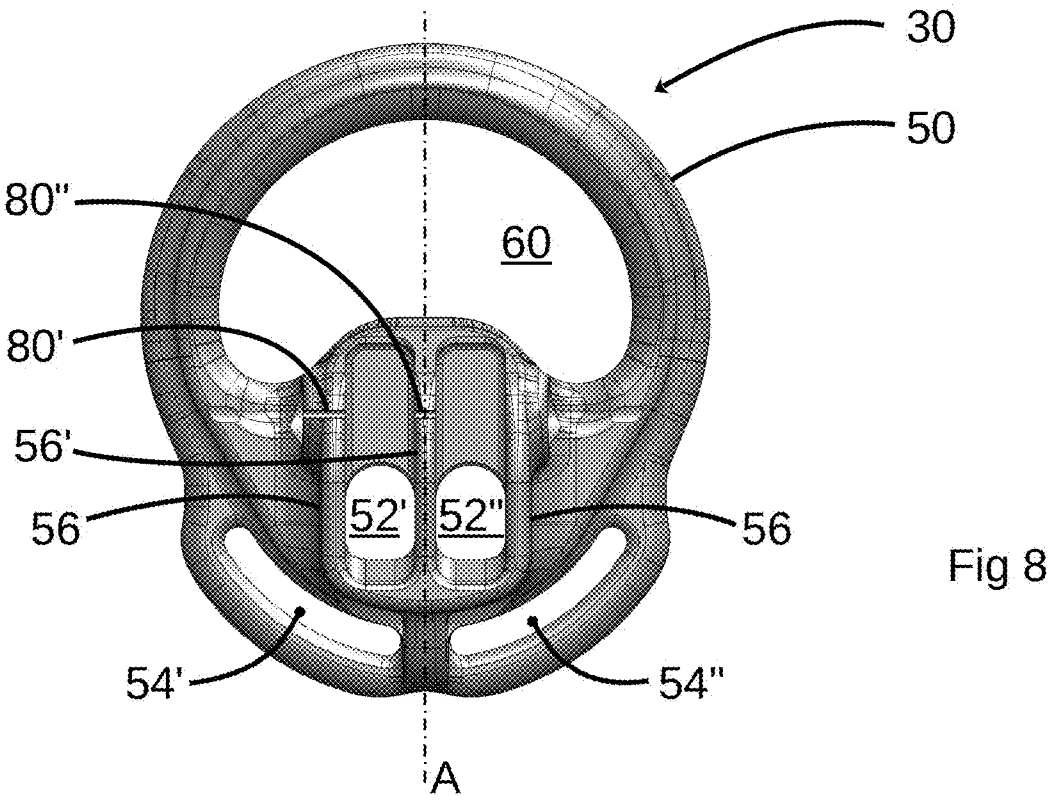
FIGS. 8 to 10 are front, back and side views of a base component of the embodiment of FIGS. 3 to 7.
Figure 9:
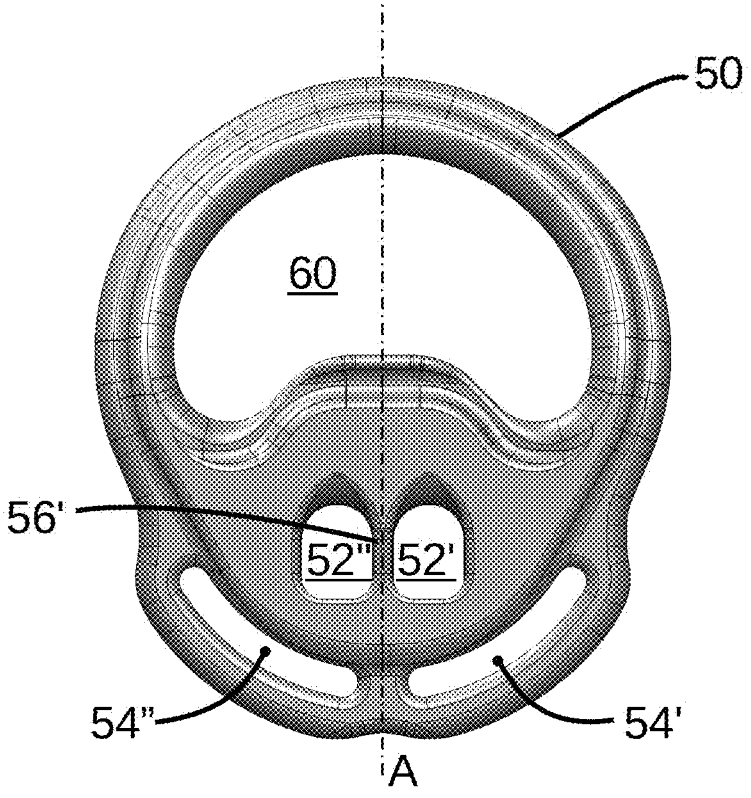
Figure 10:
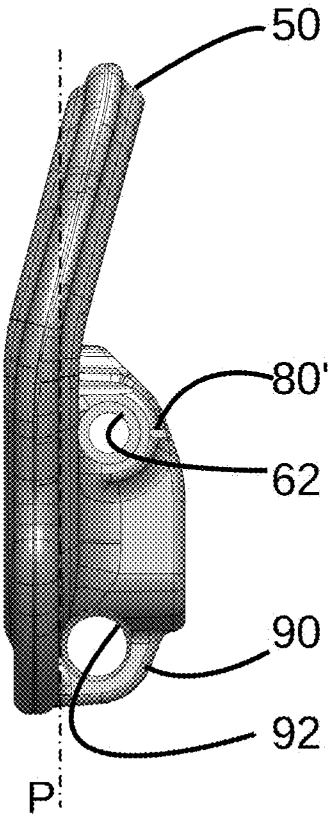

A harness of a type suitable for use with the present invention is shown in FIGS. 1 and 2.

The harness comprises two leg loops 10 that, in use, encircle a user's thighs. Each leg loop 10 is connected to a padded back 12 that rests against the small of a user's back and has side wings that extend to above a user's hips when in use. The back has a waist webbing 14 that has ends that can be interconnected by a releasable front waist buckle 16.

Each side wing has a side attachment arrangement 20. Each side attachment arrangement 20 connects the waist webbing 14 in the region of the wing through a riser webbing 18 through a respective side attachment arrangement to the corresponding leg loop 10. In this known arrangement, the side attachment arrangement 20 comprises two metal loops 22, 24 through which the waist webbing 14 passes.

The harness also includes two forward connection arrangements 30 as shown in FIG. 1 to suspend a flexible load bearing member 32 (also known as a "rope bridge") across the front of the harness. In this example, the rope bridge 32 includes two adjacent lengths of rope 32', 32". For use, the rope bridge 32 carries a sliding attachment device, a metal ring 34 in this embodiment, which is attached, for use, to a climbing line. These lengths of rope, in this embodiment, act together to transfer load from the ring 34 to the forward connection arrangements 30, but in other embodiments may transfer load from the forward connection arrangements 30 to independent external anchorages. One or both lengths of rope could be replaced with a length of webbing.

FIGS. 3 to 10 shows a first example of a forward connection arrangement embodying the invention in more detail.

The forward connection arrangement 30 includes a body 50 formed as a single-piece metal component, which is intended to be permanently incorporated into the harness, for example, by sewing. (In this context, "permanently" means that it is not intended to be separated during normal use but may be replaced during repair or refurbishment) The body 50 has a generally oval or slight figure-of-eight peripheral shape and is formed from a single piece of metal by a combination of one or more of casting, forging and machining. The body 50 extends approximately in a plane P, having inner and outer surfaces disposed to opposite sides of the plane P, and its periphery can be considered as defining a region of the plane through which, multiple holes pass. The body is broadly symmetrical about an axis A that extends within the plane and that forms a long axis of the body 50.

A pair of bridge passages 52', 52" disposed to opposite sides of the axis A approximately one third of the distance along the axis A from a first end of the axis A, each bridge passage 52 extending through the body 50 approximately perpendicular to the plane P. Each bridge passage 52 extends from the inner surface of the body 50, through the plane P, and then extends beyond the outer surface within a tubular formation of the body 50. Each bridge passage 52 has a cross-sectional shape that has a flat base surface that extends perpendicular to the axis A, side walls 56 that extend from the base surface, and an arcuate outer surface that interconnects the side walls 56. Adjacent side walls of the bridge passages 52', 52" are formed by a common web 56' within the body 50. In the alternative, the common web 56' may be omitted, with one or more elements 32', 32" of the rope bridge 32 passing through a single rope passage.

A first and a second webbing slot 54', 54" are disposed to opposite sides of the axis A. Each slot 54', 54" extends from close to the axis A (that lies between the bridge passages 52', 52") and to a first axial end of the body 50. Each slot 54', 54" extends along an arc that is a constant distance from a proximal part of the periphery of the body 50.

There is an attachment hole 60 that extends symmetrically about the axis A to partially surround the bridge holes 52', 52" and to extend to a second axial end of the body 50. This imparts the body 30 with a D-shaped attachment portion extending from the bridge passages 52 in a direction away from the webbing slots 54', 54".

All above-described holes and passages 52', 52"; 54', 54"; 60 are formed with curved peripheries and without sharp corners to avoid the creation of stress risers within the body and within any object that is passed through the hole, and to minimise abrasion of any object that is passed through the hole.

A rope adjuster assembly is constructed within one or both bridge passage 52', 52", as will now be described.

An axle bore 62 extends across each of the bridge passages 52, transverse to the axis A, being formed from coaxial bores that pass through the side walls of the bridge passages 52', 52". A cylindrical cam axle 64 is located within the axle bore 62, in which it is a close fit. A tapped bore extends axially into each end of the cam axle 64. When installed, the cam axle 64 extends past each side wall 56 through the common web 56' of the body 50. The cam axle 64 is retained in place by two bolts 66, each being threaded into a respective one of the threaded bores of the cam axle 64. A head of each bolt is received within an annular recess that surrounds each outer opening of the axle bore 62. Alternatively, the cam axle 64 may be of greater length, and be riveted in place in the bore, the bolts 64 being omitted.

Two cams 68', 68" are carried on the cam axle 64 within a respective one of the bridge passages 52', 52". Each cam 68', 68" has an axle bore 69', 69" through which the cam axle 64 passes with a close fit and a gripping surface 70', 70" that faces generally away from the cam axle 64, the gripping surfaces 70 being at a radial distance from the cam axle 64 that varies with the circumferential position of the surface 70 about the cam axle 64. Multiple ridges extend across the gripping surface 70. An end portion of each cam 68 projects from the body 50 and a region 72', 72" of the outer surface adjacent to the end portion is knurled.

A respective close-wound torsion spring 76', 76" is associated with each cam 68', 68". Each spring 76 has active coils surrounding the cam axle 64 within a recess of one of the cams 68 radially inwardly of the gripping surface 70. The wire of each spring 76 is terminated with two legs that extend from the active coils parallel to the cam axle 64. A first leg of each spring 76 is received in one of several holes 78 that extends axially into the cam 68, and a second leg is received within a slot 80', 80" formed in a side wall of each bridge passage 52', 52", the slots opening to the outer surface of the body 50, one slot 80" being formed in the common web 56'. The springs 76', 76" serve to bias the cams 68', 68" in rotation in a direction around the cam axle 64 in a direction that the end portion of the cam 68 is urged towards the base of the bridge passage 52; the cams 68', 68" are oriented such that the radius of the gripping surface increases in that direction.

Each length of rope 32', 32" of the rope bridge 32 passes through a respective one of the bridge passages 52', 52", the rope bridge 32 extending between the inner surfaces of the bodies 50 of the two forward connection arrangements. The lengths of rope 32', 32" and the bridge passages 52', 52" are dimensioned such that the ropes 32', 32" are a close fit within the passages 52', 52" so that the ropes encounter the cams 68', 68" at approximately a constant angle irrespective of the angle at which the ropes 32', 32" enter and exit the bridge passages 52', 52". The gripping surfaces 70 of the cams 68', 68" are urged into contact with the ropes 32', 32" by the action of the springs 76', 76". If tension is applied to the inner length of the rope bridge 32 between the forward connection arrangements 30', 30", this will tend to cause the cams to rotate in the direction of action of the springs 76', 76", thereby tending to increase the effective radius of the gripping surface 70, with the result that the ropes 32', 32" are clamped between the gripping surfaces 70 and the base of the bridge passages 52', 52". An increase in tension in the rope bridge 32 will increase the clamping force such that movement of the ropes 32', 32" is prevented. If the ropes 32', 32" are pulled from the outside of the forward connection arrangements 30, the cams are turned against the action of the springs 76', 76", thereby tending to decrease the effective radius of the gripping surface 70, with the result that the ropes 32', 32" are no longer clamped and can slide through the bridge passages 52', 52", shortening the effective length of the rope bridge 32.

If a user wishes to increase the effective length of the rope bridge 32, force can be applied manually to the projecting end portions of the cams and the adjacent knurled surface to rotate them against the action of the springs 76', 76" to reduce the force applied by the gripping surfaces 70 to the rope or until the gripping surface 70 come out of contact with the ropes 32', 32". The ropes 32', 32" can then be pulled through the body 50 in either direction.

In this embodiment, the body 50 further includes a lug 90 which is disposed between the webbing slots 54', 54" (or centrally of a single webbing slot), and projects generally perpendicularly from the plane P. A circular attachment aperture 92 passes through the lug 90. This can serve as an attachment for a connector for a load supporting platform in embodiments of the invention disclosed and claimed in WO-A-2020/065279 of the present applicant. Such a lug is an optional feature of embodiments of this invention.

Figure 11:
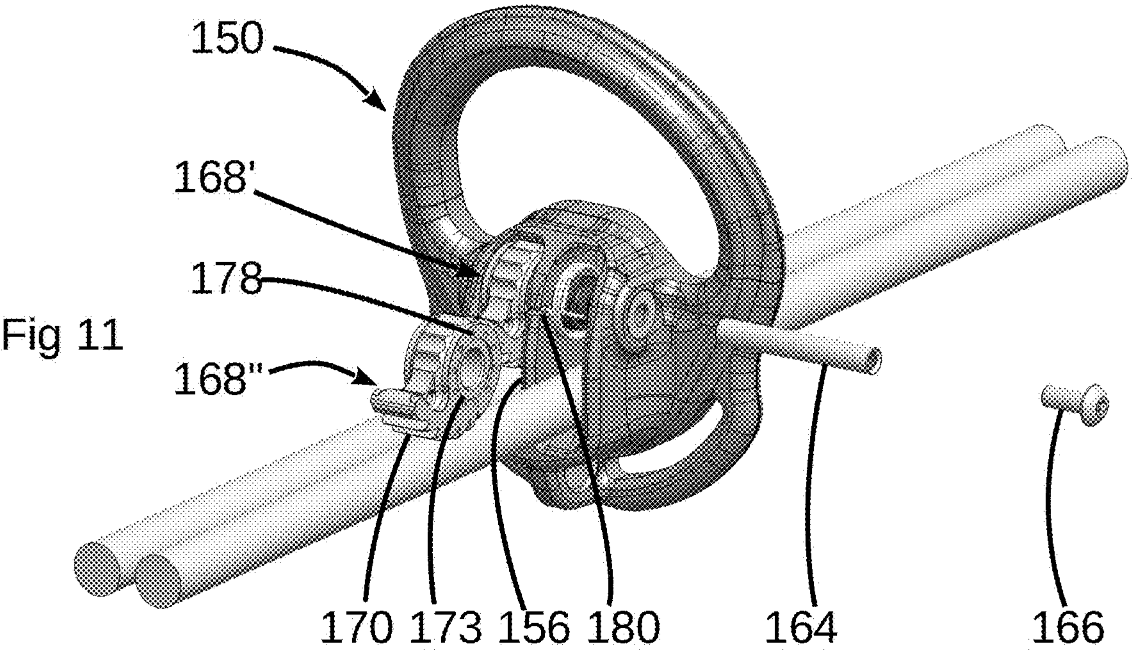
FIGS. 11 and 12 are exploded views of a modified embodiment of the invention.
Figure 12:
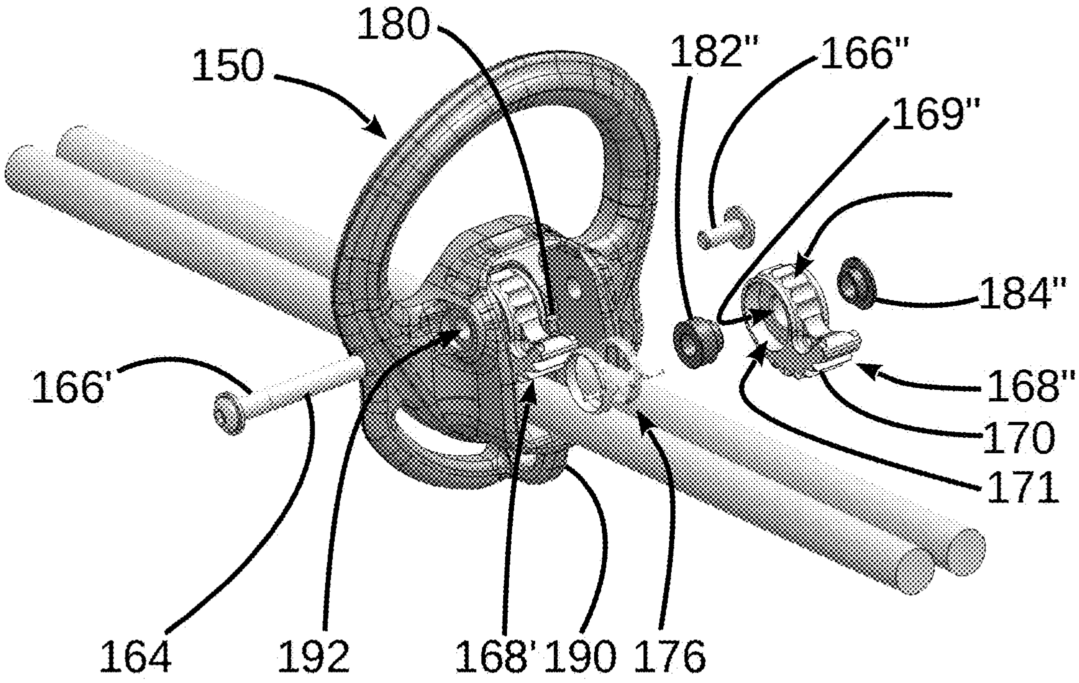

The embodiment of FIGS. 11 and 12 has an external appearance substantially identical to that of the preceding Figures and uses the same body 150 (with the exception that one slot 80' is omitted (a slot 180 in the common web 156 is present). This embodiment has a different internal construction, which will now be described.

In this embodiment, the cam axle 164 is a cylindrical metal rod with axial tapped bores formed into it from opposite ends. First and second axle retaining bolts 166', 166" are compatible with the threads formed in the cam axle 164.

The cams 168', 168" are handed and mirrored about the axis A. Each cam has an annular radial web that extends radially between the gripping surface 170 and the axle bore 169', 169". The web is recessed, the recess 171 (referred to as the spring recess) that is adjacent to the common web 156 being deeper than the opposite recess 173. A plurality of small holes 178 pass through the web parallel to the cam axle 164.

In this embodiment, each cam 168 is carried on the cam axle 164 by inner and outer cam bushes 182, 184. Each cam bush 182, 184 has a through bore that is a close fit on the cam axle 164. Each cam bush 182, 184 has a stepped outer surface, with a lesser diameter part that is a close fit in the axle bore 169 of the cam 168. The lesser diameter parts are inserted into the axle bore 192 and abut one another within the cam.

A single spring 176 has two sets of active coils surrounding the cam axle 64 within an inner recess 171 of a respective one of the cams 168 radially inwardly of the gripping surface. The sets of active coils are interconnected by a connecting leg and each set of active coils has a projecting terminating leg. The connecting leg is received within the slot 180 in the common web 156 to resist rotation of the spring 176 about the cam axle 164. Each terminating leg is received within a small hole 178 in a respective one of the cams 168.

In the completed assembly, each cam 168 is carried on its bushes 182, 184, which are, in turn, carried on the cam axle 164. Each set of active coils surrounds a respective one of the inner bushes 182. The axle retaining bolts 166', 166" are screwed into opposite ends of the axle through holes in the body 150.

In an alternative configuration, potentially applicable to any embodiment, the cam axle 64, 164 is retained in the body by riveting its end and omitting the axle retaining bolt 60, 160. This can be done at one or both ends of the cam axle 64, 164.

What is claimed is:

1. A harness for supporting a person working at height, comprising:
- a back,
- leg loops,
- two forward connection arrangements, and
- a flexible load-bearing member that extends between the connection arrangements,
- wherein said flexible load-bearing member carries a sliding attachment device which attaches to a climbing line, the forward connection arrangements serving to transferring load from the back and the leg loops to the flexible load-bearing member, wherein each forward connection arrangement comprises:
- a body that has apertures through which a leg riser webbing of the harness pass to connect the body to the back and the leg loops of the harness,
- a bridge passage that extends through the body through which the flexible load-bearing member passes; and wherein:
- in at least one forward connection arrangement the body further comprises an integrated rope adjuster constructed within the bridge passage,
- wherein the rope adjuster includes i) a cam in the bridge passage, the cam being pivoted on an axle carried on the body, and ii) a biasing spring disposed to bias the cam towards a locking surface of the body within the bridge passage to effect locking of the flexible load-bearing member.

2. The harness of claim 1 wherein the axle is located in a bore within the body.

3. The harness of claim 1 wherein the load-bearing member includes an elongate element.

4. The harness of claim 3 wherein the elongate element is a rope.

5. The harness of claim 3 wherein the elongate element is a length of webbing.

6. The harness of claim 1 wherein the load-bearing member includes two or more similar or dissimilar elongate elements.

7. The harness of claim 1 wherein the load-bearing member comprises two or more ropes.

8. The harness of claim 1 wherein each rope passes through a respective bridge passage of the body.

9. The harness of claim 8 having a rope adjuster in each bridge passage.

10. The harness of claim 9 wherein cams of each of the rope adjusters are disposed for rotation about a common axis.

11. The harness of claim 10 wherein the cams of each of the rope adjusters are carried on a common axle.

12. The harness of claim 1 wherein the body is a one-piece metal component.

13. The harness of claim 1 wherein the body includes a projecting lug through which an attachment aperture passes.

14. The harness of claim 1, further comprising:
- an axle bore that extends across the bridge passage, transverse to an axis (A) that extends within a plane of the body and that forms an axis of the body,
- the axle bore being formed by coaxial bores that pass through side walls of the bridge passage,
- the axle being a cam axle located within the axle bore and extending past each side wall of the bridge passage, the cam axle being retained in place.

15. A harness for supporting a person working at height, comprising:

a back;

leg loops;

two forward connection arrangements;

leg riser webbing; and a flexible load-bearing member that extends between the connection arrangements, wherein said flexible load-bearing member carries a sliding attachment device which attaches to a climbing line, wherein the forward connection arrangements transfer load from the back and the leg loops to the flexible load-bearing member, wherein each forward connection arrangement comprises:

a body that is a one-piece component, wherein the body has apertures through which the leg riser webbing pass to connect the body to the back and to the leg loops, a bridge passage that extends through the body through which the flexible load-bearing member passes;

a cam axle extending across the bridge passage;

a rope adjuster cam carried by, and pivoting on, the cam axle, the rope adjuster cam having a gripping surface and a recess located radially inwardly of the gripping surface, wherein the bridge passage is sized to pass a length of the load-bearing member with the gripping surface of the rope adjuster cam facing an outer surface of the rope bridge; and a biasing spring, the biasing spring having active coils surrounding the cam axle and disposed within the recess of the rope adjuster cam, the biasing spring biasing the gripping surface of the rope adjuster cam towards the outer surface of the body within the bridge passage to effect locking of the flexible load-bearing member within the bridge passage.

* * * * *